(12) United States Patent
Sharma et al.

(10) Patent No.: US 12,281,462 B2
(45) Date of Patent: Apr. 22, 2025

(54) MODULAR SYSTEM MODE CONTROLLER AND RELATED METHODS

(71) Applicant: Caterpillar Inc., Peoria, IL (US)

(72) Inventors: Ankit Sharma, Peoria, IL (US); Michael D. Beyer, Chillicothe, IL (US); Thomas M. Sopko, East Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 171 days.

(21) Appl. No.: 18/046,690

(22) Filed: Oct. 14, 2022

(65) Prior Publication Data

US 2024/0125099 A1  Apr. 18, 2024

(51) Int. Cl.
*E02F 9/26* (2006.01)
*E02F 9/20* (2006.01)
*E02F 9/24* (2006.01)

(52) U.S. Cl.
CPC ............ *E02F 9/268* (2013.01); *E02F 9/2025* (2013.01); *E02F 9/24* (2013.01)

(58) Field of Classification Search
CPC ........... E02F 9/268; E02F 9/2025; E02F 9/24; G05B 23/0291; G05B 2219/25314; G05B 2219/2637; G05B 2219/45017
See application file for complete search history.

(56) References Cited

U.S. PATENT DOCUMENTS

| | | | | |
|---|---|---|---|---|
| 6,115,656 A * | 9/2000 | Sudolsky | ................. | B64F 5/60 |
| | | | | 701/3 |
| 6,226,902 B1 * | 5/2001 | Heyne | ................. | E02F 9/2004 |
| | | | | 37/348 |
| 6,643,577 B1 * | 11/2003 | Padgett | ................. | E02F 9/2012 |
| | | | | 318/568.18 |
| 2004/0143297 A1 * | 7/2004 | Ramsey, III | ......... | A61N 1/3975 |
| | | | | 607/5 |

(Continued)

FOREIGN PATENT DOCUMENTS

| | | |
|---|---|---|
| CN | 202995430 U | 6/2013 |
| CN | 113656769 A | 11/2021 |

(Continued)

OTHER PUBLICATIONS

Written Opinion and International Search Report for Int'l. Patent Appln. No. PCT/US2023/074531, mailed Jan. 3, 2024 (12 pgs).

*Primary Examiner* — Frederick M Brushaber (57) ABSTRACT

A control system for a machine includes one or more component controllers for one or more components of the machine. The control system also includes a supervisory controller, connected to the one or more component controllers, and having at least one supervisory processor configured to perform operations comprising receiving supervisory system inputs, including at least one of a machine component status input, a key switch input, a directional input, or an operator presence input, from an operator of the machine, requesting and receiving, from each of the one or (Continued)

more component controllers, a status of the one or more components, and, upon receiving an indication that a status of a component, of the one or more components, is faulted, disabling the faulted component, and disabling any other components, of the one or more components, that require the faulted component for operation.

20 Claims, 5 Drawing Sheets

(56) References Cited

U.S. PATENT DOCUMENTS

| | | | | |
|---|---|---|---|---|
| 2005/0112428 A1* | 5/2005 | Freeman | ............... | B60L 58/33 |
| | | | | 429/513 |
| 2005/0225165 A1* | 10/2005 | Naik | ............... | B60T 8/321 |
| | | | | 303/20 |
| 2007/0005203 A1* | 1/2007 | Sundaram | ............... | B60W 50/0205 |
| | | | | 701/31.4 |
| 2007/0293989 A1* | 12/2007 | Norris | ............... | G05B 9/03 |
| | | | | 700/245 |
| 2016/0259327 A1 | 9/2016 | Oonishi | | |
| 2019/0250687 A1* | 8/2019 | Allahut | ............... | G06F 1/30 |
| 2022/0042281 A1* | 2/2022 | Gentle | ............... | E02F 9/24 |

FOREIGN PATENT DOCUMENTS

| | | |
|---|---|---|
| CN | 217157135 U | 8/2022 |
| DE | 102007037346 | 2/2009 |
| EP | 3528065 | 8/2019 |

* cited by examiner

MODULAR SYSTEM MODE CONTROLLER AND RELATED METHODS

TECHNICAL FIELD

The present disclosure relates generally to a modular system mode controller and related methods, and, more particularly, to a modular system mode controller for operating various machines having varying components.

BACKGROUND

Different types of machines, such as wheel loaders, motor graders, such as tractors, and other construction equipment, require different types and different combinations of components to perform various operations, and, therefore, require controllers capable of operating the different types and different combinations of components. When a single controller is used in a particular machine, the instructions or software to be executed by the controller require a relatively long time to complete operations, such as a start-up sequence or a shut-down sequence, because the controller must communicate with each of the individual components of the machine. Detection of faults in one or more of the components requires a relatively long time, as well, due to the need for the controller to communicate with each component regarding a status and an operability of the component. Debugging of the instructions or software and narrowing down of an issue, such as one or more faults, also requires relatively more time. Further, the controller and the instructions or software for same may only be usable on that particular machine and for a machine and components from a particular supplier, and would not be suitable for or useable on other types of machines or components.

CN202995430U discusses a system for synchronous precision control of a plurality of independent type motion controllers. The independent type motion controllers have synchronous input/output interfaces, with every two of the plurality of independent type motion controllers being in connection to form a synchronous loop through the input/output interfaces, and one of the plurality of independent type motion controllers in the synchronous loop being designated as a main control device and the others of the plurality of independent type motion controllers being designated as secondary devices. When initialization is completed, the independent type motion controller designated as a main control device performs time sampling on all the independent type motion controllers in the synchronous loop and calculates synchronous work time of all the independent type motion controllers in a next period.

While the system discussed in CN202995430U provides for a main control device, control of independent type motion controllers may not account for different types and different combinations of components to be used in a system. Further, designation of the main control device occurs after an initialization process, and thus, the main control device may not operate to control the independent type motion controllers during a start-up sequence, for example. The system, described as being used for a plurality of motion type controllers, may be limited to use in machines having that type of component, and may not be suitable for different types of machines, each having various types of components. The system also does not account for disabling and enabling of components based on whether a particular component is faulted.

The modular system mode controller of the present disclosure may solve one or more of the problems set forth above and/or other problems in the art. The scope of the current disclosure, however, is defined by the attached claims, and not by the ability to solve any specific problem.

SUMMARY

In one aspect, a control system for a machine may include one or more component controllers for one or more components of the machine, each of the one or more component controllers having a component memory that stores component instructions, and at least one component processor configured to execute the component instructions, and a supervisory controller, connected to the one or more component controllers, and having a supervisory memory that stores supervisory instructions, and at least one supervisory processor. The at least one supervisory processor is configured to execute the supervisory instructions to perform operations including receiving supervisory system inputs, including at least one of a machine component status input, a key switch input, a directional input, or an operator presence input, from an operator of the machine, requesting and receiving, from each of the one or more component controllers, a status of the one or more components, and, upon receiving an indication that a status of a component, of the one or more components, is faulted, disabling the faulted component, and disabling any other components, of the one or more components, that require the faulted component for operation.

According to another aspect of disclosure, a control system for a machine may include one or more component controllers for one or more components of the machine, each of the one or more component controllers having a component memory that stores component instructions, and at least one component processor configured to execute the component instructions, and a supervisory controller, connected to the one or more component controllers, and having a supervisory memory that stores supervisory instructions, and at least one supervisory processor. The at least one supervisory processor is configured to execute the supervisory instructions to perform operations including receiving supervisory system inputs, including at least one of a machine component status input, a key switch input, a directional input, or an operator presence input, from an operator of the machine, requesting and receiving, from each of the one or more component controllers, a status of the one or more components, upon receiving an indication that a status of a component, of the one or more components, is operational, enabling the operational component, and outputting an operational component indicator to any other components, of the one or more components, that require the operational component for operation.

According to yet another aspect of the disclosure, a method of configuring a control system for a plurality of different types of machines, including at least a wheel loader, a motor-grader, a mining truck, and a marine-type machine, is provided. The control system includes one or more component controllers for one or more components of a machine, of the plurality of different types of machines, the one or more component controllers being configured to provide outputs to the one or more components and each of the one or more component controllers having a component memory that stores component instructions, and at least one component processor configured to execute the component instructions. The control system also includes a supervisory controller, connected to the one or more component controllers, configured to receive inputs from and generate outputs to the one or more component controllers, and having a supervisory memory that stores supervisory instructions, and at least one supervisory processor. The at least one supervisory processor is configured to execute the supervisory instructions to perform the method, which includes receiving supervisory system inputs, including at least one of a machine component status input, a key switch input, a directional input, or an operator presence input, from an operator of the machine, requesting and receiving, from each of the one or more component controllers, a status of the one or more components, upon receiving an indication that a status of a component, of the one or more components, is operational, enabling the operational component, outputting an operational component indicator to any other components, of the one or more components, that require the operational component for operation, and, upon receiving an indication that a status of a component, of the one or more components, is faulted, disabling the faulted component, and disabling any other components, of the one or more components, that require the faulted component for operation.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. Unless explicitly excluded, the use of the singular to describe a component, structure, or operation does not exclude the use of plural such components, structures, or operations or their equivalents. The use of the terms "a" and "an" and "the" and "at least one" or the term "one or more," and similar referents in the context of describing the invention (especially in the context of the following claims) are to be construed to cover both the singular and the plural, unless otherwise indicated herein or clearly contradicted by context. The use of the term "at least one" followed by a list of one or more items (for example, "at least one of A and B" or one or more of A and B") is to be construed to mean one item selected from the listed items (A or B) or any combination of two or more of the listed items (A and B; A, A and B; A, B and B), unless otherwise indicated herein or clearly contradicted by context. Similarly, as used herein, the word "or" refers to any possible permutation of a set of items. Moreover, in this disclosure, relative terms, such as, for example, "about," "generally," "substantially," and "approximately" are used to indicate a possible variation of ±10% in the stated value. In addition, in this disclosure, the term "automatically" is used to indicate that the function is performed within a device, e.g., a controller, without action on the part of an operator.

Figure 1:
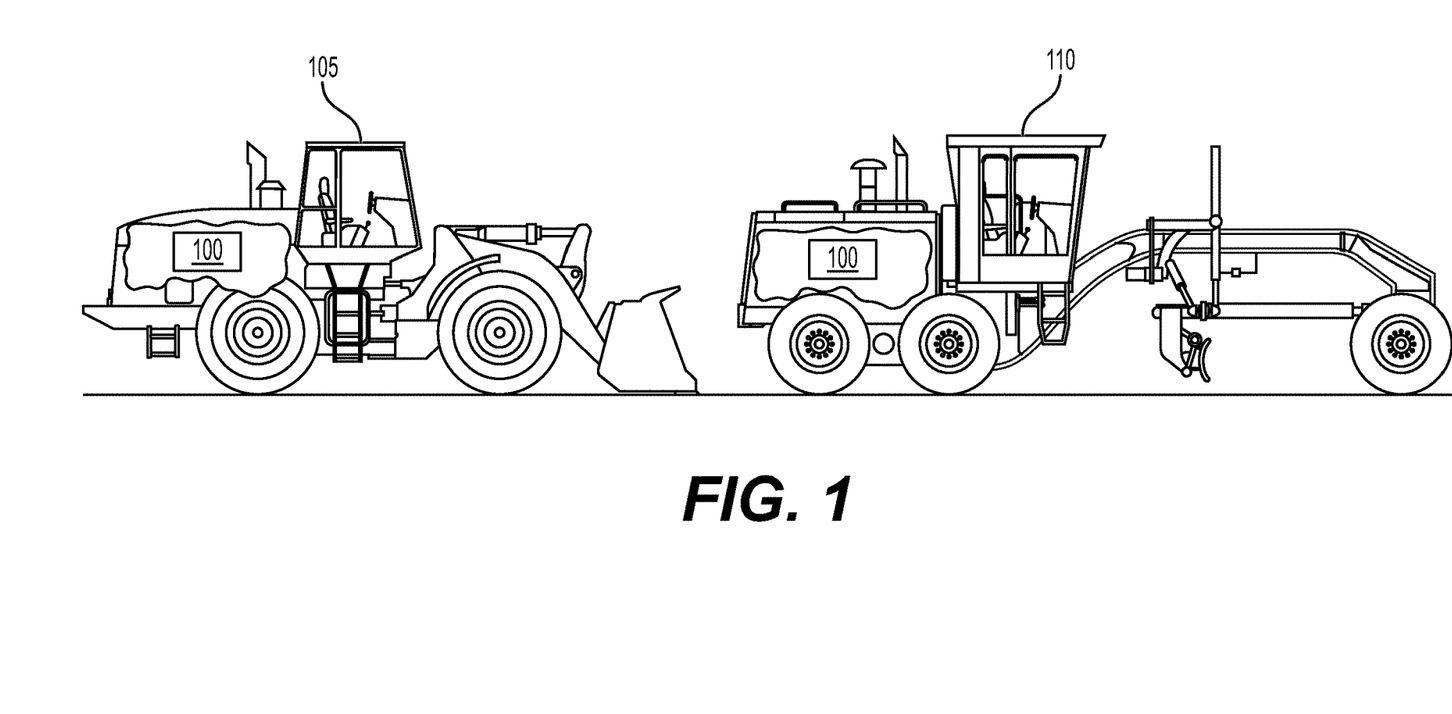
FIG. 1 shows a schematic diagram of a pair of machines, including a wheel loader and a motor grader, in which a modular system mode controller, in accordance with the present disclosure, may be used.

Referring to FIG. 1, a control system 100 in accordance with the present disclosure may be installed and used in a machine, such as a wheel loader 105 and/or a motor grader 110. In addition to wheel loaders and motor graders, the control system 100 may be installed and used in other types of machines, including but not limited to marine-type machines and mining trucks. The control system 100, and the related methods described below, provide one common mode controller that can be leveraged across the various types of machines having different configurations of components.

Figure 2:
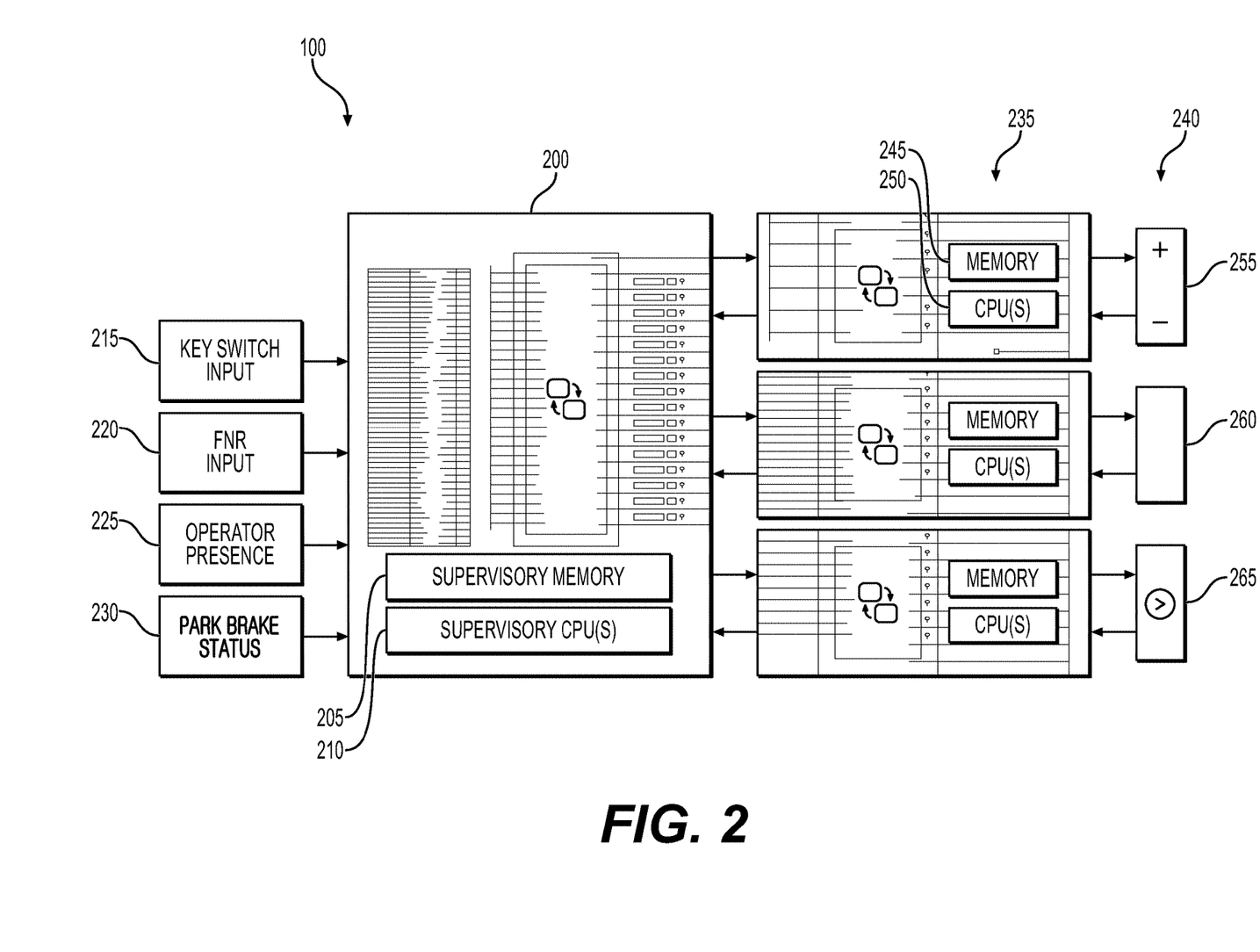
FIG. 2 shows a schematic diagram of components of the modular system mode controller, in accordance with the present disclosure.

Referring to FIG. 2, the control system 100 includes a supervisory controller 200 having a supervisory memory 205 and one or more supervisory processors 210. The supervisory memory 205 may store data and/or software routines that may assist the supervisory controller 200 in performing its functions, such as the functions of method 300 of FIG. 3, method 400 of FIG. 4, and method 500 of FIG. 5, discussed below. Further, the supervisory memory 205 may also store data received from the various inputs associated with the machine 105, 110, including, for example, a key switch input 215, a forward-neutral-reverse (FNR) input 220, an operator presence input 225, and a park brake status input 230, discussed in more detail below. The supervisory memory 205 may also store data received from any of a plurality of component controllers, discussed in more detail below. More generally, the supervisory memory 205 could store data from any other suitable input associated with the machine 105, 110, such an input being referred to generically as a machine component status input. In addition, the supervisory controller 200 checks operator inputs and machine and component statuses while executing a startup sequence and a shutdown sequence. Numerous commercially available microprocessors can be configured to perform the functions of the supervisory controller 200. It should be appreciated that the supervisory controller 200 could readily embody a general machine controller capable of controlling numerous other machine functions. Alternatively, a special-purpose machine controller could be provided. Various other known circuits may be associated with the supervisory controller 200, including signal-conditioning circuitry, communication circuitry, hydraulic or other actuation circuitry, and other appropriate circuitry.

More specifically, a key switch input 215 may include one of a key on input, when the ignition of the machine is switched or pressed ON, and a key off input, when the ignition of the machine is switched or pressed OFF. The FNR input 220 may include one of a forward gear, a neutral gear, or a reverse gear, indicating an operating state of a transmission of the machine. The forward gear input may also indicate a specific gear of a multi-speed transmission. The operator presence input 225 may include one of operator present, when an operator is physically present within the machine, and operator absent, when an operator is not physically present within the machine. The park brake status input 230 may include one of park brake on, indicating that the park brake of the machine is on or applied to prevent movement of the machine, and park brake off, indicating that the park brake of the machine is off or not applied, permitting movement of the machine. Any other type of status input, also referred to generically as a machine component status input, can have a value of at least two states, e.g., operational or non-operational.

Again referring to FIG. 2, the control system 100 includes one or more component controllers 235, as a superset of controllers, for controlling one or more components 240, respectively. Each component controller 235 has a memory 245 and one or more processors 250. The memory 245 may store data and/or software routines that may assist the component controller 235 in performing its functions of the specific components discussed below. Further, the memory 245 may also store data received from the component 240 that it controls, and data that it receives from the supervisory controller 200. Numerous commercially available microprocessors can be configured to perform the functions of the component controllers 235. It should be appreciated that each of the component controllers 235 could readily embody a general machine controller capable of controlling numerous other machine functions. Alternatively, a special-purpose machine controller could be provided. Various other known circuits may be associated with the component controller 235, including signal-conditioning circuitry, communication circuitry, hydraulic or other actuation circuitry, and other appropriate circuitry. Each component controller 235 reports status of the component 240 to the supervisory controller 200, and enables or disables operation of the component 240 following commands from the supervisory controller 200. The supervisory controller 200 may also enable of disable components 240, via the component controllers 235, based on fault statuses of components 240 provided by the component controllers.

Specific examples of components 240 for which component controllers 235 are provided include a power source 255, such as a battery or a fuel cell, a direct current (DC) bus 260 and an electric pump motor 265, as shown in FIG. 2. The components 240 are not limited to these components, however, and may include, without limitation, one or more of a hydraulic motor, a motive traction motor, a battery thermal monitoring system (BTMS), a DC-DC converter, a charger system, such as a trolley-type system, and a power grid receiving system.

The modular architecture of the control system 100 allows for the supervisory controller 200 to be generic, in that it can be used or reused for different machines, without requiring compatibility for communication between the supervisory controller 200 and components 240. Instead, component messages and sequencing may be handled by the component controllers 235, which, in turn, provide feedback as inputs to the supervisory controller 200. The component controllers 235 may also be generic in that they may be used or reused for different technology and may be used or reused for different suppliers of components. The control system 100 described herein further improves management of fault notifications for the components of a machine, as the supervisory controller 200 can make enabling or disabling decisions regarding components 240 depending on a severity of fault, as discussed in more detail below.

INDUSTRIAL APPLICABILITY

The control system 100 of the present disclosure and, in particular, the methods executed by the control system 100, including the supervisory controller 200 and the component controllers 235, may provide for a configurable modular system mode controller for use in performing various operations of different machines. The control system 100 is capable of operating different types and different combinations of components. And, by virtue of the data and software routines used by the supervisory controller 200 and the component controllers 235, as described herein, efficiency of control of various components, including determining faults and/or enabling and disabling components, is improved, and the software routines, particularly the software routine for the supervisory controller 200, can be more easily and efficiently debugged.

Figure 3:
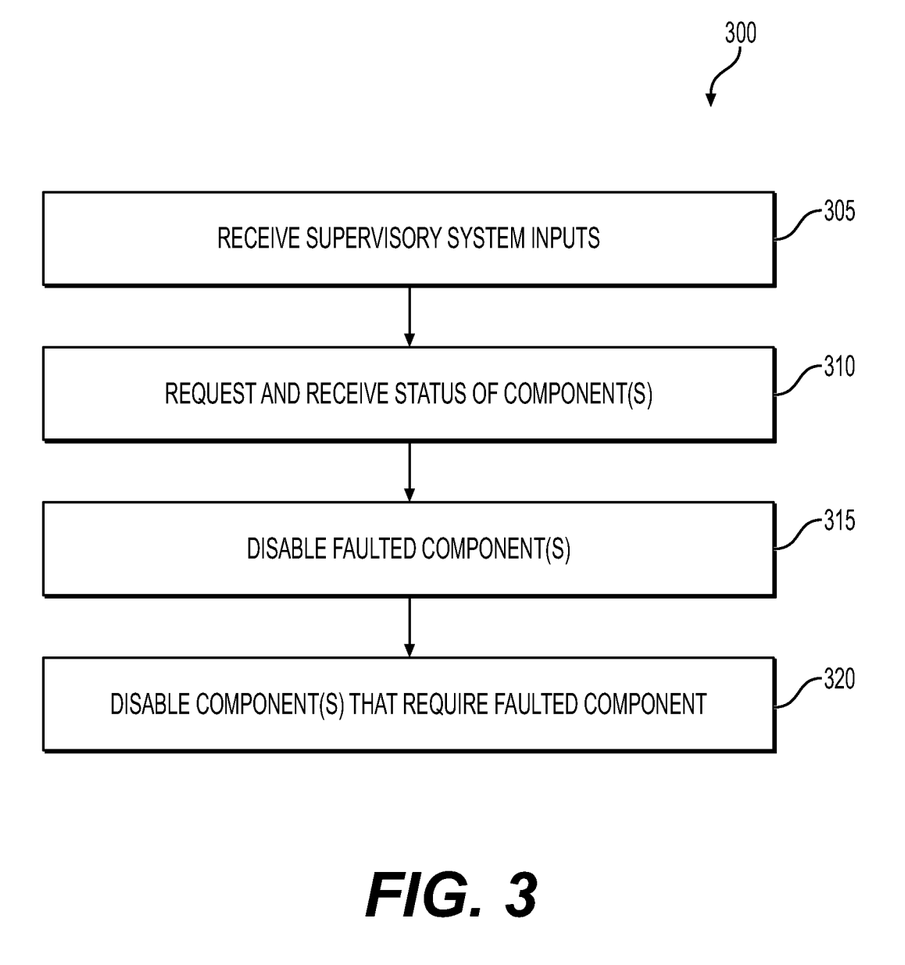
FIG. 3 shows a flowchart of a control method performed by the modular system mode controller, in accordance with the present disclosure.

FIG. 3 shows a flowchart for a method 300 executed by the supervisory controller 200 of the control system 100. As noted above, the control system 100 may include one or more component controllers 235 for one or more components 240 of a machine, such as a wheel loader 105. The supervisory controller 200 is connected to the one or more component controllers 235, and in using a software routine, comprising supervisory instructions, at least one processor 210 of the supervisory controller 200 performs a step 305 of receiving supervisory system inputs. The supervisory system inputs may include one or more of a key switch input 215, an FNR input 220, an operator presence input 225, and a park brake status input 230, as described above. The inputs may be communicated to the supervisory controller 200 by an operator of the wheel loader 205 (or other machine). The supervisory controller 200 may proceed to subsequent steps on a condition of certain supervisory system inputs, for example, a key on input, an operator present input, and/or a park brake off input. The method 300 may also include a step 310 of requesting and receiving, from each of the one or more component controllers 235, a status of the one or more components 240 of the wheel loader 105. For example, the wheel loader 105 may include a power source 255, a DC bus 260, and a pump motor 265, among other components, and a status of each of these components may be communicated by a corresponding component controller 235, with a status including one or more of standby, operation, shutdown, and faulted. The method may further include a step 315 in which, upon receiving an indication (that is, an input from one of the component controllers 235) that the component 240 is faulted, the supervisory controller 200 may disable the faulted component 240, and, in step 320, may disable any other components 240 of the machine that require the faulted component 240 for operation.

In a case in which the component controller 235 for the power source 255 returns to the supervisory controller 200 a status of faulted, the supervisory controller 200 may disable the faulted power source 255 and any components of the wheel loader 105 that require the power source 255 for operation, such as the DC bus 260 and/or the pump motor 265, by switching an enable flag for each of the power source 255, the DC bus 260, and/or the pump motor 265. Still further, the faulted status output by the component controller 235 to the supervisory controller 200 may indicate whether the fault is a critical fault, rendering the component 240 inoperable and requiring the disabling of the same, or a trivial fault, which may not necessarily render the component 240 inoperable, but may indicate maintenance of the component 240 is needed. In this manner, the supervisory controller 200 may complete a sequence of operations, such as a start-up sequence, a disabling sequence, or a fault sequence, in relatively less time.

Figure 4:
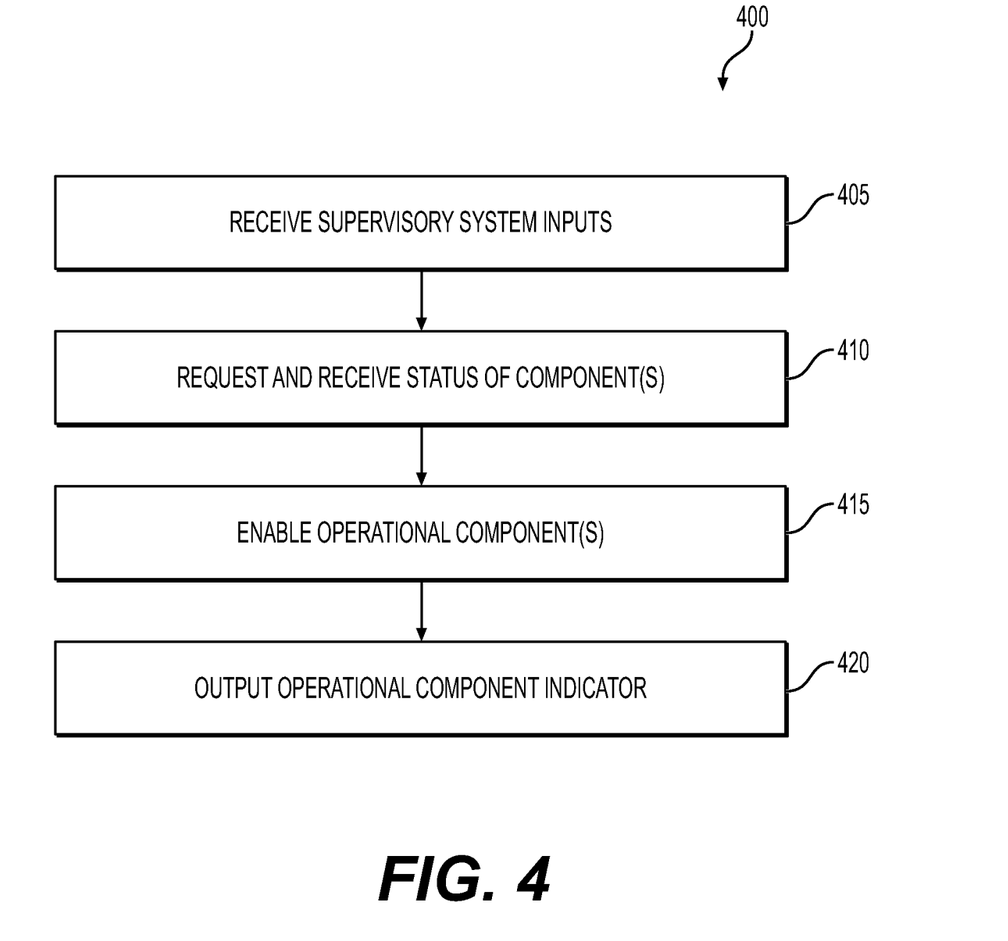
FIG. 4 shows a flowchart of another control method performed by the modular system mode controller, in accordance with the present disclosure.

FIG. 4 shows a flowchart for a method 400 executed by the supervisory controller 200 of the control system 100. As noted above, the control system 100 may include one or more component controllers 235 for one or more components 240 of a machine, such as a wheel loader 105. The supervisory controller 200 is connected to the one or more component controllers 235, and in using a software routine, comprising supervisory instructions, at least one processor 210 of the supervisory controller 200 performs a step 405 of receiving supervisory system inputs. The supervisory system inputs may include one or more of a key switch input 215, an FNR input 220, an operator presence input 225, and a park brake status input 230, as described above. The inputs may be communicated to the supervisory controller 200 by an operator of the wheel loader 205 (or other machine). The supervisory controller 200 may proceed to subsequent steps on a condition of certain supervisory system inputs, for example, a key on input, an operator present input, and/or a park brake off input. The method 400 may also include a step 410 of requesting and receiving, from each of the one or more component controllers 235, a status of the one or more components 240 of the wheel loader 105. For example, the wheel loader 105 may include a power source 255, a DC bus 260, and a pump motor 265, among other components, and a status of each of these components may be communicated by a corresponding component controller 235, with a status including one or more of standby, operation, shutdown, and faulted. The method may further include a step 415 in which, upon receiving an indication (that is, an input from one of the component controllers 235) that the component 240 is operational, the supervisory controller 200 may enable the operational component 240. Further, the method 400 may include a step 420 of outputting an operational component indicator to any other components 240 that require the operational component 240 for operation. In addition, the supervisory component 200 may enable all such operational components 240 for operation by switching an enable flag for each of the components 240.

As a specific example, in a case in which the component controller 235 for the power source 255 returns to the supervisory controller 200 a status of operational, the supervisory controller 200 may enable the power source 255 via a component controller 235 for the power source 255, and enable any other components 240 of the wheel loader 105 that require the power source 255 for operation, such as the DC bus 260 and/or the pump motor 265, by switching an enable flag for each of the power source 255, the DC bus 260, and/or the pump motor 265. In this manner, the supervisory controller 200 may complete a sequence of operations, such as a start-up sequence and an enabling sequence, in relatively less time.

Figure 5:
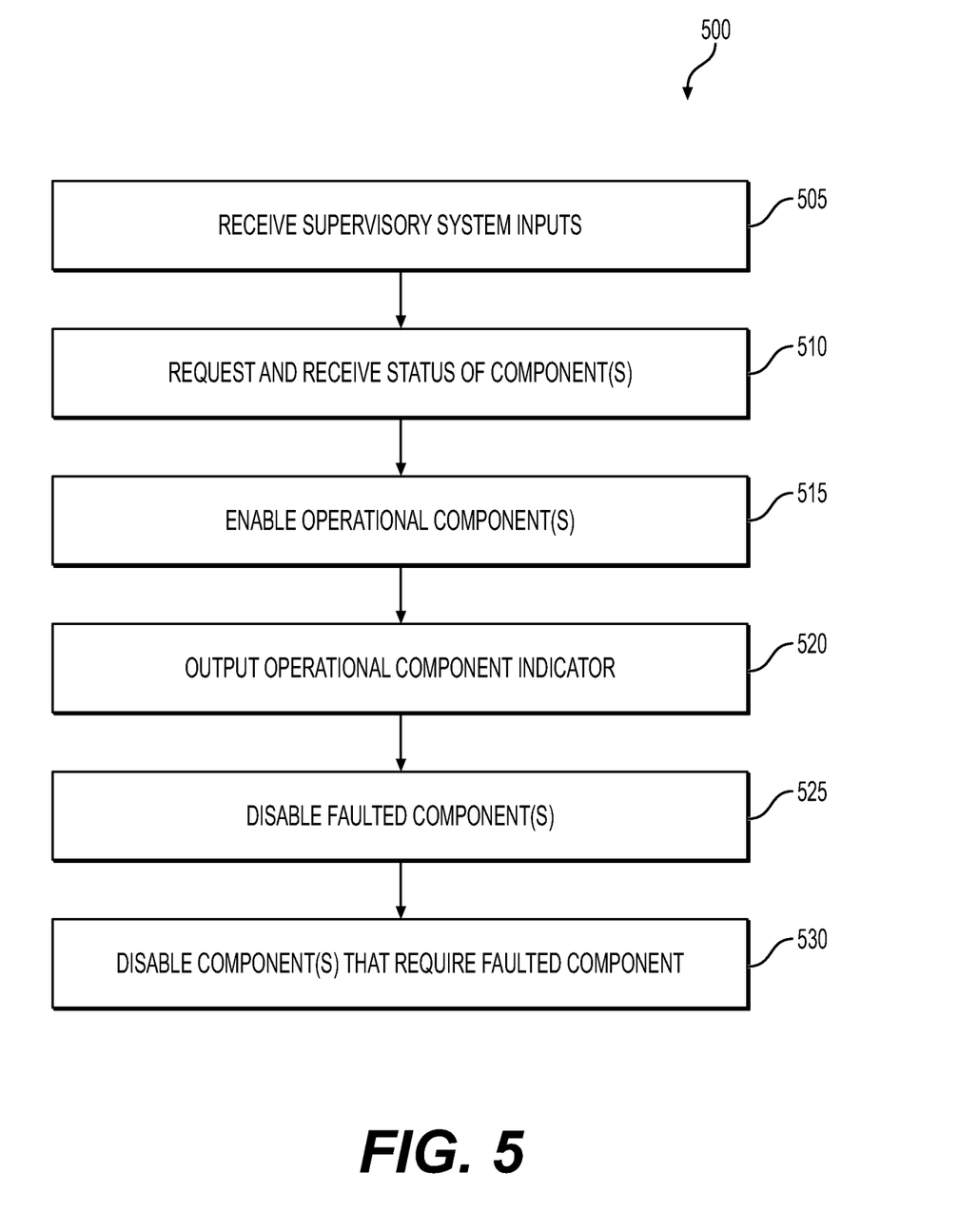
FIG. 5 shows a flowchart of still another control method performed by the modular system mode controller, in accordance with the present disclosure.

FIG. 5 shows a flowchart for another method 500 executed by the supervisory controller 200 of the control system 100. As noted above, the control system 100 may include one or more component controllers 235 for one or more components 240 of a machine, such as a wheel loader 105. The supervisory controller 200 is connected to the one or more component controllers 235, and in using a software routine, comprising supervisory instructions, at least one processor 210 of the supervisory controller 200 performs a step 505 of receiving supervisory system inputs. The supervisory system inputs may include one or more of a key switch input 215, an FNR input 220, an operator presence input 225, and a park brake status input 230, as described above. The inputs may be communicated to the supervisory controller 200 by an operator or by a machine sensor of the wheel loader 205 (or other machine). The supervisory controller 200 may proceed to subsequent steps on a condition of certain supervisory system inputs, for example, a key on input, an operator present input, and/or a park brake off input. The method 500 may also include a step 510 of requesting and receiving, from each of the one or more component controllers 235, a status of the one or more components 240 of the wheel loader 105. For example, the wheel loader 105 may include a power source 255, a DC bus 260, and a pump motor 265, among other components, and a status of each of these components may be communicated by a corresponding component controller 235, with a status including one or more of standby, operation, shutdown, and faulted. The method 500 may further include a step 515 in which, upon receiving an indication (that is, an input from one of the component controllers 235) that the component 240 is operational, the supervisory controller 200 may enable the operational component 240. Further, the method 500 may include a step 520 of outputting an operational component indicator to any other components 240 that require the operational component 240 for operation. In addition, the supervisory component 200 may enable all such operational components 240 for operation by switching an enable flag for each of the components 240. The method 500 may further include a step 525 in which, upon receiving an indication (that is, an input from one of the component controllers 235) that the component 240 is faulted, the supervisory controller 200 may disable the faulted component 240, and a step 530 in which the supervisory controller 200 may disable other components 240 of the machine that require the faulted component 240 for operation.

As with the method 400 described above, as a specific example for method 500, in a case in which the component controller 235 for the power source 255 returns to the supervisory controller 200 a status of operational, the supervisory controller 200 may enable the power source 255 via a component controller 235 for the power source 255, and enable any other components 240 of the wheel loader 105 that require the power source 255 for operation, such as the DC bus 260 and/or the pump motor 265, by switching an enable flag for each of the power source 255, the DC bus 260, and/or the pump motor 265. In this manner, the supervisory controller 200 may complete a sequence of operations, such as a start-up sequence and an enabling sequence, in relatively less time. And, as with the method 300 described above, for method 500, in a case in which the component controller 235 for the power source 255 returns to the supervisory controller 200 a status of faulted, the supervisory controller 200 may disable the faulted power source 255 and any components of the wheel loader 105 that require the power source 255 for operation, such as the DC bus 260 and/or the pump motor 265, by switching an enable flag for each of the power source 255, the DC bus 260, and/or the pump motor 265. Still further, the faulted status output by the component controller 235 to the supervisory controller 200 may indicate whether the fault is a critical fault, rendering the component 240 inoperable and requiring disabling of the same, or a trivial fault, which may not necessarily render the component 240 inoperable, but may indicate maintenance of the component 240 is needed. In this manner, the supervisory controller 200 may complete a sequence of operations, such as a start-up sequence, a disabling sequence, or a fault sequence, in relatively less time.

By virtue of the control system 100 and the related methods described herein, it is possible to provide one common mode controller that can be leveraged across various machines with different configurations of components. Further, components can be easily enabled or disabled based on the configuration of the machine, so that the components can be used in different machines. The modular architecture allows the supervisory controller to be generic, in that it can be used or reused for different machines, without requiring compatibility for communication between the supervisory controller and components. Instead, component messages and sequencing may be handled by the component controllers, which, in turn, provide feedback as inputs to the supervisory controller. Further, the component controllers may also be generic in that they may be used or reused for different technology or may be used or reused for different suppliers of components. In addition, the control system 100 may be used with components from various suppliers, as the supervisory controller may be configurable to work with component controllers of components from those various, different suppliers. By virtue of the control system 100 of the present disclosure, it is possible to reduce an amount of time needed to complete operations, such as a start-up sequence or a shut-down sequence, because the supervisory controller need not communicate with each individual sensors or individual aspects associated with a component, and instead, communicates with component controllers that may perform operations in a simultaneous manner or in an efficient sequential manner.

The control system 100 described herein further improves management of fault notifications for the components of a machine, as the supervisory controller can make enabling or disabling decisions regarding components depending on a severity of fault. In addition, the control system 100 provides for more efficient detection of faults in one or more components, and, as a result, a timely enabling or disabling of components, particularly where some components rely on others for operability. The software routines executed by the supervisory controller and the component controllers may also be relatively easy to debug, and it may also be relatively easier to narrow down issues with respect to faulty components and/or with respect to the supervisory controller. Debugging of the software routine of the supervisory controller may also require relatively less time, as the software routines of the individual component controllers do not need to be debugged as part of such a debugging process for the supervisory controller. The software routines further provide for relatively clean implementation thereof.

It will be apparent to those skilled in the art that various modifications and variations can be made to the disclosed system and methods without departing from the scope of the disclosure. Other embodiments of the system and the methods will be apparent to those skilled in the art from consideration of the specification and practice of the control system and methods disclosed herein. It is intended that the specification and examples be considered as exemplary only, with a true scope of the disclosure being indicated by the following claims and their equivalents.

What is claimed is:

1. A control system for a machine, the control system comprising:
    one or more component controllers for one or more components of the machine, the one or more components including at least a power source, and at least one of a direct current (DC) bus or a pump motor, wherein at least the DC bus and the pump motor require the power source to be operational in order to be operational themselves, each of the one or more component controllers having a component memory that stores component instructions, and at least one component processor configured to execute the component instructions; and
    a supervisory controller, connected to the one or more component controllers, and having a supervisory memory that stores supervisory instructions, and at least one supervisory processor configured to execute the supervisory instructions to perform operations comprising:
        receiving supervisory system inputs, including at least one of a machine component status input, a key switch input, a directional input, or an operator presence input, from an operator of the machine;
        determining whether one or more of the received supervisory system inputs is in an operational state or a non-operational state;
        upon determining that one or more of the received supervisory system inputs is in the operational state, requesting and receiving, from each of the one or more component controllers, a status of the one or more components, the status of the one or more components being one of standby, operational, shutdown, or faulted; and
        upon receiving an indication that a component, of the one or more components, is faulted, disabling the faulted component, and disabling any other components, of the one or more components, that require the faulted component for operation, including, upon receiving an indication that the power source is faulted, disabling the at least one of the DC bus or the pump motor that require the power source for operation.

2. The control system of claim 1, wherein the key switch input is one of a key on input or a key off input, the directional input is one of a forward, a neutral, or a reverse gear input, and the operator presence input is one of operator being present in the machine or operator being absent from the machine.

3. The control system of claim 1, wherein the supervisory controller disables the one or more components by switching an enable flag for each of the one or more components.

4. The control system of claim 1, wherein a faulted status further comprises an indication of one of a critical fault and a trivial fault.

5. The control system of claim 4, wherein the disabling of the faulted component occurs upon determining the indication is a critical fault.

6. The control system of claim 1, wherein the operations executed based on the supervisory instructions further include:
    upon receiving an indication that a component, of the one or more components, is operational, enabling the operational component,
    outputting an operational component indicator to any other components, of the one or more components, that require the operational enabled component for operation, including, upon receiving an indication that the power source is operational, including outputting the operational component indicator to the at least one of the DC bus or the pump motor to thereby enable the at least one of the DC bus or the pump motor, and
    enabling, upon enabling the operational component, the other components that require the operational enabled component, including enabling the at least one of the DC bus or the pump motor upon enabling the power source.

7. The control system of claim 1, wherein the supervisory system inputs further include a park brake status input, which is one of park brake on or park brake off.

8. A control system for a machine, the control system comprising:
    one or more component controllers for one or more components of the machine, including at least a power source, and at least one of a direct current (DC) bus or a pump motor, wherein at least the DC bus and the pump motor require the power source to be operational in order to be operational themselves, each of the one or more component controllers having a component memory that stores component instructions, and at least one component processor configured to execute the component instructions; and a supervisory controller, connected to the one or more component controllers, and having a supervisory memory that stores supervisory instructions, and at least one supervisory processor configured to execute the supervisory instructions to perform operations comprising:

receiving supervisory system inputs, including at least one of a machine component status input, a key switch input, a directional input, or an operator presence input, from an operator of the machine;

determining whether one or more of the received supervisory system inputs is in an operational state or a non-operational state;

upon determining that one or more of the received supervisory system inputs is in the operational state, requesting and receiving, from each of the one or more component controllers, a status of the one or more components, the status of the one or more components being one of standby, operational, shutdown, and faulted;

upon receiving an indication that a component, of the one or more components, is operational, enabling the operational component; and outputting an operational component indicator to any other components, of the one or more components, that require the operational enabled component for operation, including, upon receiving an indication that the power source is operational, outputting the operational component indicator to the at least one of the DC bus or the pump motor to thereby enable the at least one of the DC bus or the pump motor.

9. The control system of claim 8, wherein the key switch input is one of a key on input or a key off input, the directional input is one of a forward, a neutral, or a reverse gear input, and the operator presence input is one of operator being present in the machine or operator being absent from the machine.

10. The control system of claim 8, wherein the supervisory controller enables the one or more components by switching an enable flag for each of the one or more components.

11. The control system of claim 8, wherein the operations executed based on the supervisory instructions further include enabling the other components that require the operational enabled component, including enabling the at least one of the DC bus or the pump motor upon enabling the power source.

12. The control system of claim 8, wherein a faulted status further comprises an indication of one of a critical fault or a trivial fault.

13. The control system of claim 12, wherein the disabling of the faulted component occurs upon determining the indication is a critical fault.

14. The control system of claim 8, wherein the supervisory system inputs further include a park brake status input, which is one of park brake on or park brake off.

15. A method of configuring a control system for a plurality of different types of machines, including at least a wheel loader, a motor-grader, a mining truck, and a marine-type machine, wherein the control system comprises:

one or more component controllers for one or more components of a machine, of the plurality of different types of machines, the one or more components including at least a power source, and at least one of a direct current (DC) bus or a pump motor, wherein at least the DC bus and the pump motor require the power source to be operational in order to be operational themselves, the one or more component controllers being configured to provide outputs to the one or more components and each of the one or more component controllers having a component memory that stores component instructions, and at least one component processor configured to execute the component instructions; and a supervisory controller, connected to the one or more component controllers, configured to receive inputs from and generate outputs to the one or more component controllers, and having a supervisory memory that stores supervisory instructions, and at least one supervisory processor configured to execute the supervisory instructions to perform the method, the method comprising:

receiving supervisory system inputs, including at least one of a machine component status input, a key switch input, a directional input, or an operator presence input, from an operator of the machine;

determining whether one or more of the received supervisory system inputs is in an operational state or a non-operational state;

upon determining that one or more of the received supervisory system inputs is in the operational state, requesting and receiving, from each of the one or more component controllers, a status of the one or more components;

upon receiving an indication that a component, of the one or more components, is operational, enabling the operational component;

outputting an operational component indicator to any other components, of the one or more components, that require the operational component for operation, including, upon receiving an indication that the power source is operational, outputting the operational component indicator to the at least one of the DC bus or the pump motor to thereby enable the at least one of the DC bus or the pump motor; and upon receiving an indication that a status of a component, of the one or more components, is faulted, disabling the faulted component, and disabling any other components, of the one or more components, that require the faulted component for operation, including, upon receiving an indication that the power source is faulted, disabling the at least one of the DC bus and the pump motor that require the power source for operation.

16. The method of claim 15, wherein the key switch input is one of a key on input or a key off input, the directional input is one of a forward, a neutral, or a reverse gear input, and the operator presence input is one of operator being present in the machine or operator being absent from the machine.

17. The method of claim 15, wherein the supervisory controller enables and disables the one or more components by switching an enable flag for each of the one or more components.

18. The method of claim 15, wherein a faulted status further comprises an indication of one of a critical fault and a trivial fault.

19. The method of claim 18, wherein the disabling of the faulted component occurs upon determining the indication is a critical fault.

20. The method of claim 15, further comprising, upon enabling the operational component, enabling the other components that require the operational enabled component, including enabling the at least one of the DC bus or the pump motor upon enabling the power source.

\* \* \* \* \*